Nov. 5, 1929.  J. C. HAGGART, JR  1,734,331
FOUR-WHEEL TRUCK
Filed May 6, 1927   5 Sheets—Sheet 5
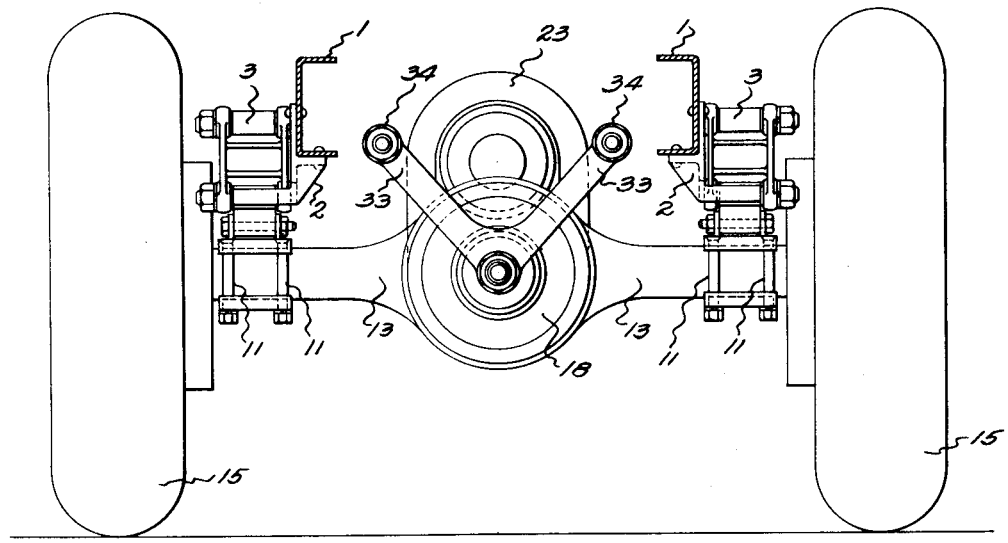
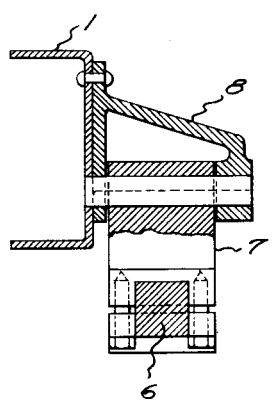
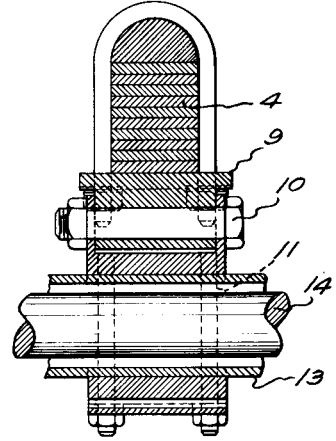
Inventor
John C. Haggart, Jr.
By
Attorney Patented Nov. 5, 1929

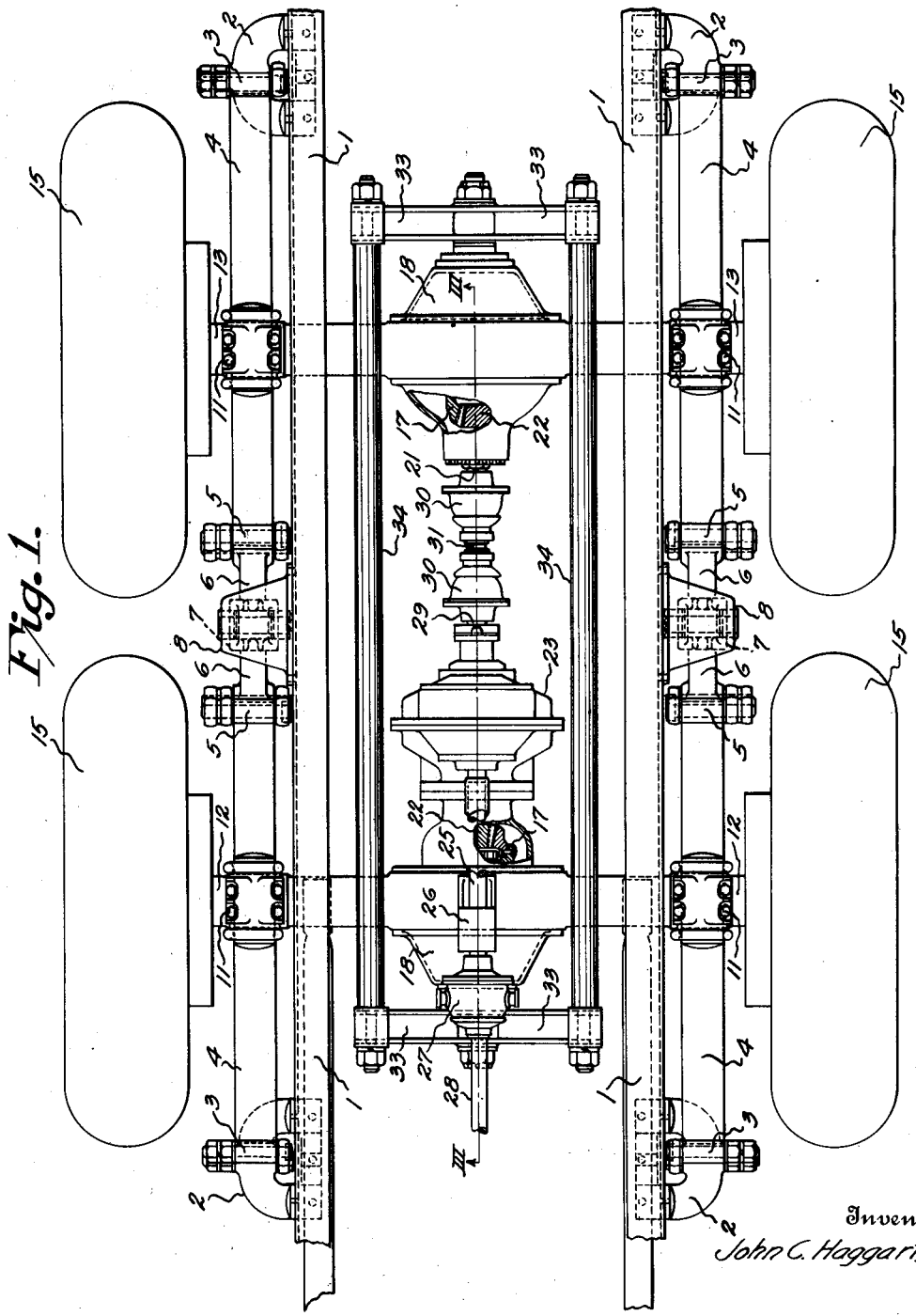

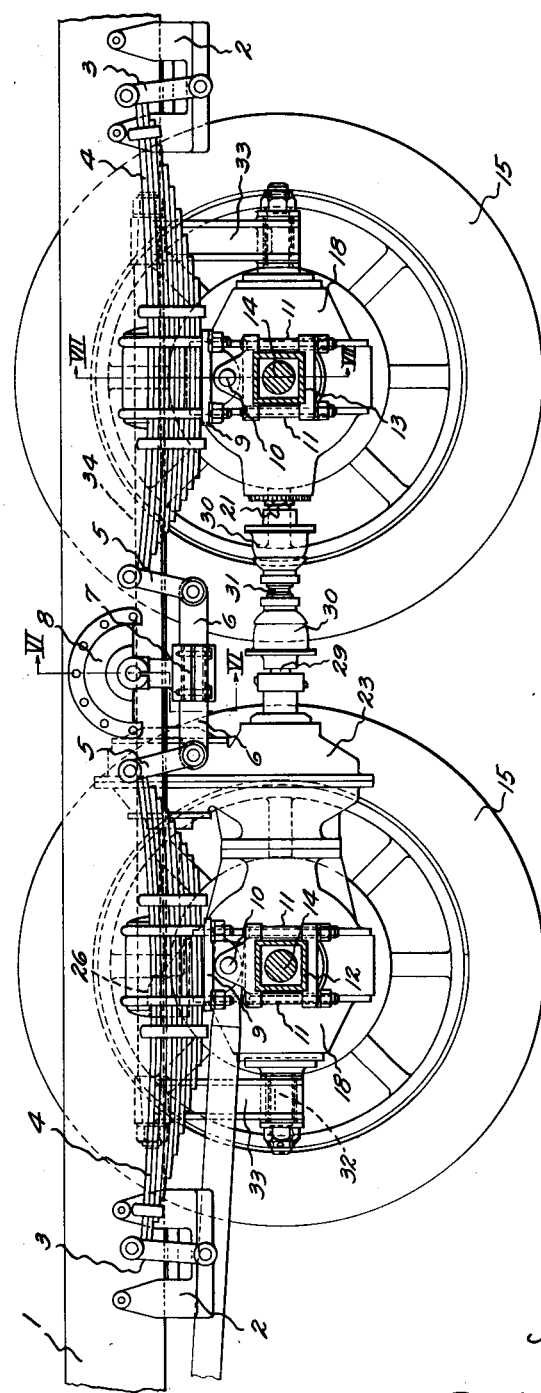

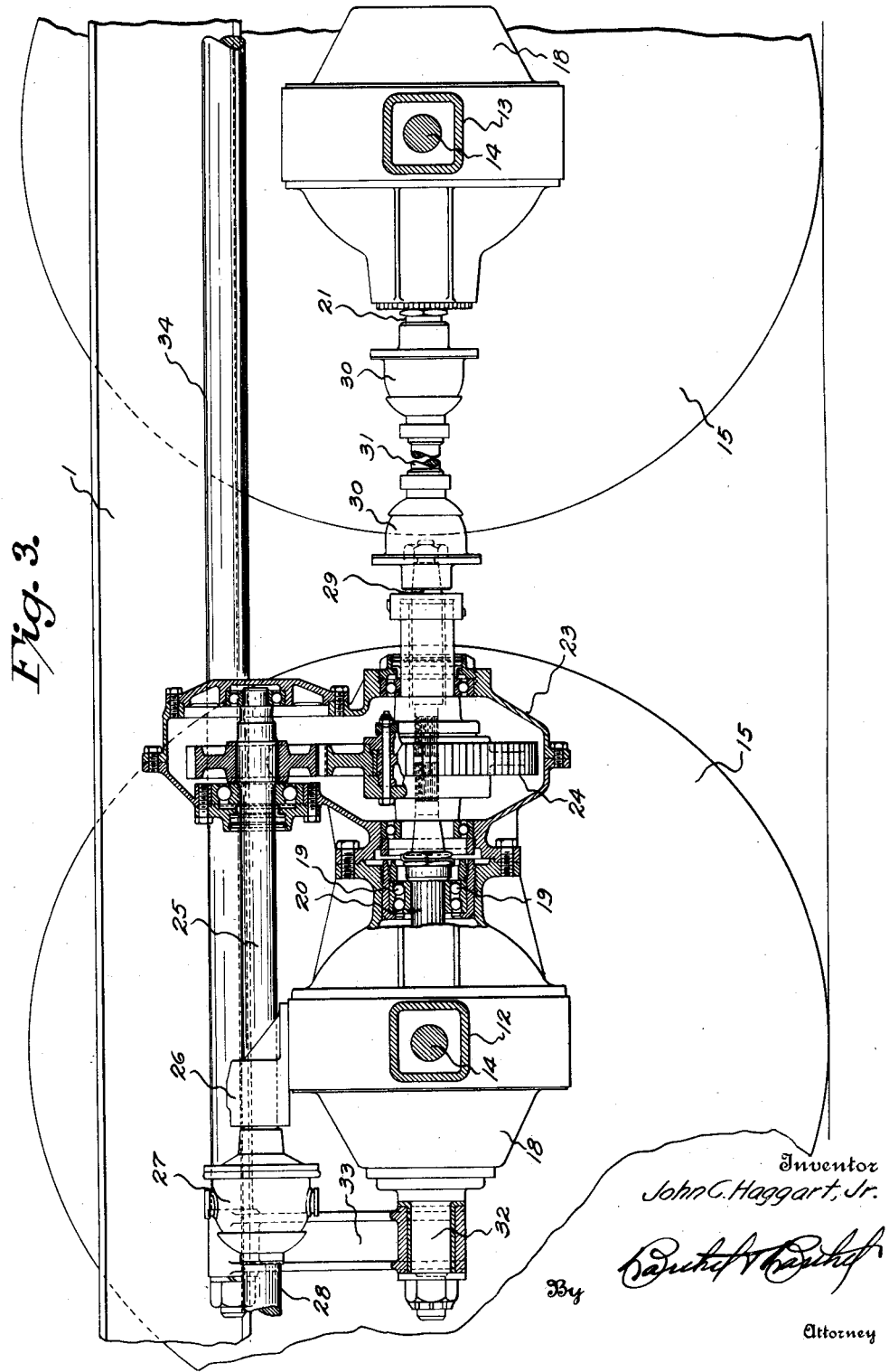

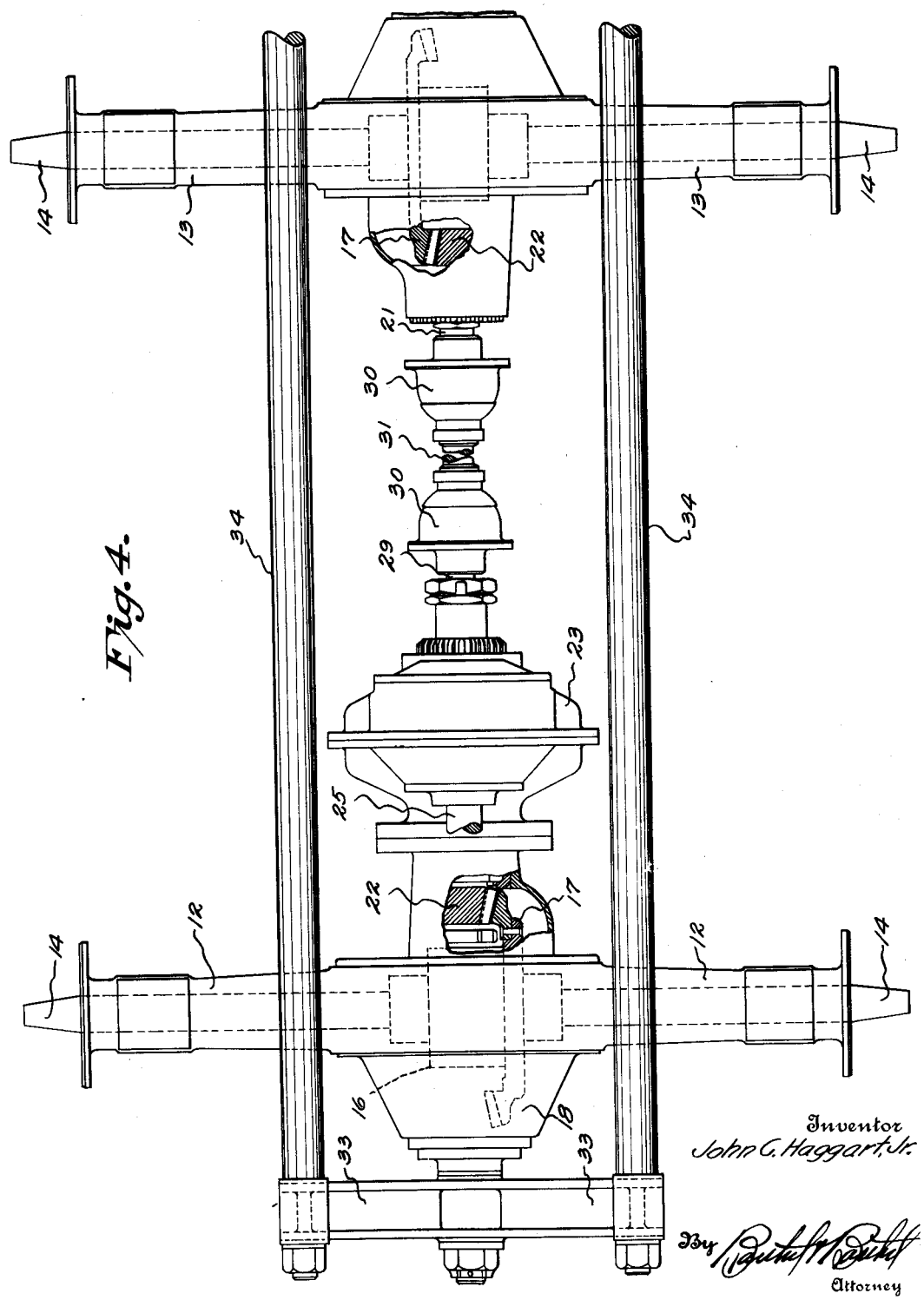

1,734,331

UNITED STATES PATENT OFFICE

JOHN C. HAGGART, JR., OF ALMA, MICHIGAN, ASSIGNOR TO REPUBLIC MOTOR TRUCK CO., INC., OF ALMA, MICHIGAN, A CORPORATION OF MICHIGAN

FOUR-WHEEL TRUCK

Application filed May 6, 1927. Serial No. 189,219.

In the operation of motor driven vehicles equipped with four-wheel driven trucks, there is a weaving action of the axle assemblies, incident to irregular road conditions, that causes considerable wear on the power transmission mechanism to the ground engaging wheels of the truck. This means a sacrifice of power and the entire truck is subjected to such stresses and strains as to necessitate repeated overhauling. The most pronounced trouble is in connection with the power transmission to the axle assemblies of the four-wheel truck because one axle assembly may assume various angular positions relative to the horizontal and the adjoining truck, then again a reduction of gear mechanism is essential and the space is limited for such reduction gear mechanism, particularly when differential gear mechanisms are associated with the axles of the truck.

My invention aims to provide a better four-wheel truck construction than heretofore used, and my invention may be characterized in the following particulars.

First, there are articulated axle housings having differential casings maintained substantially in longitudinal alinement under all operating conditions so that power may be transmitted to the differential mechanisms without subjecting the transmission mechanism to excessive stresses and strains that would necessarily cause a loss of power.

Second, a reduction mechanism is embodied in the drive between the rear axle assemblies with the drive shaft to such reduction gearing constantly maintained parallel to the horizontal plane of the rear axle housing over which it is mounted, thus maintaining an effective driving relation between the gears of the reduction mechanism.

Third, an equalizing spring suspension is used which will permit of one axle assembly adjusting itself to road conditions independent of the other axle assembly, without subjecting the driving mechanism to any torque or twisting that would be detrimental to the operating mechanism supported by the truck.

Fourth, there is an exceedingly compact four-wheel truck design that may be advantageously used in connection with six-wheel vehicles, as heavy duty trucks, motor busses and the like, and it is believed that the above and other advantages will be apparent when the invention is better understood by aid of the drawings, which will now be described in detail.

Figure 1 is a plan of a four-wheel truck in accordance with this invention;

Fig. 2 is a side elevation of the same, partly in section, as though two of the side wheels of the truck were removed;

Fig. 3 is an enlarged longitudinal sectional view taken approximately on the line III—III of Fig. 1;

Fig. 4 is a plan of that portion of the truck shown in Fig. 3, with the wheels removed;

Fig. 5 is an end view of the truck;

Fig. 6 is an enlarged cross sectional view taken on the line VI—VI of Fig. 2; and Fig. 7 is an enlarged cross sectional view taken on the line VII—VII of Fig. 2.

In the drawings, the reference numerals 1 denote the channel side frames of vehicle chassis and attached to the outer sides of these frames are brackets or hangers 2 for shackles 3 to which are pivotally connected the ends of semi-elliptic laminated suspension springs 4 having the confronting ends thereon connected by shackles 5 to equalizing bars 6 supported in hangers 7. The hangers 7, as best shown in Figs. 1, 2 and 6 are carried by brackets 8 attached to the chassis frame 1, intermediate the positions of the brackets 2.

The middle portions of the springs 4 are on spring perches 9 pivotally connected, as at 10, to mountings 11 on the ends of rear axle housings 12 and 13.

Suitably journaled in the rear axle housings 12 and 13 are axle shafts 14 having the outer ends thereof provided with ground engaging wheels 15, while the inner ends are operatively connected by differential mechanisms 16, including driven ring gears 17. The differential mechanisms are within casings 18 and the inner ends of these casings are provided with bearings 19 for driven shafts 20 and 21 having drive gears 22 meshing with the ring gears 17.

Attached to the differential casing 18 of the axle housing 12 is a transmission casing 100

23 for a conventional form of reduction gear mechanism 24 adapted to be driven by an extension shaft 25, journaled in the upper part of the transmission casing 23, also in a bearing 26 mounted on the differential casing 18 of the axle housing 12. The extension shaft 25 is connected by a conventional form of universal joint 27 to a power shaft 28. Since the transmission casing 23 is supported from the axle housing 12 and the extension shaft 25 supported by the bearing on the transmission casing 23, there is a constant parallel relation between the shafts 20 and 25, irrespective of the transverse angular relation of the differential casing 18 relative to the power shaft 28 or any other part of the driving mechanism. There are no stresses or strains that would tend to distort the driving mechanism thus far described and subject the same to wear and tear with a loss of power.

The reduction gearing 24 also drives a shaft 29 coupled to the shaft 20 through the reduction gearing, as best shown in Fig. 3, and the shaft 29 is coupled to the shaft 21 of the rear axle assembly by universal joints 30 and a coupling shaft 31, said universal joints being of a conventional form that will permit of the shafts 29, 31 and 21 assuming an angular relation relative to one another. It is by virtue of this driving connection between the differential mechanisms 16 of the axle housings 12 and 13 that the ground engaging wheels 15 may be driven in synchronism and at a reduced speed relative to the power shaft 28.

The differential casings 18 have axle studs 32 and loose on said studs are substantially V-shaped frames 33 having the upper ends thereof extending into a plane above the axle housings 12 and 13, said frames being rigidly connected by longitudinal parallel tie rods 34 which form somewhat of a rigid overhead connection between the axle assemblies of the four-wheel truck, yet permit of these axle assemblies assuming angular positions relative to each other.

In the operation of the truck, sidewise or lateral tilting of either axle assembly, caused by one of the wheels 15 entering a road or passing over an obstruction, is permitted through the medium of the universal joints 30 between the reduction gear mechanism 24 and the axle housing 13. If the differential casing 18 of either rear axle housing is raised or lowered above or below its normal level position, the equalizing frame 34 tends to adjust the axle housings and this is brought about by the axle shafts being journaled in the axle housings, consequently said axle housings may have a turning movement relative to the axles. For instance, considering Fig. 3, if the rear universal joint 30 is swung downwardly and the rear end of the frame 34 swung upwardly, the axle housing 12 is tilted relative to the axle shafts in said housing. This would necessarily raise the front universal joint 30 and the coupling shaft 31 between said universal joints permits of the angular relation of one axle assembly relative to the other. Since the drive extension shaft 25 and the reduction gear mechanism are movable with the axle assembly 12 there is a constant, positive and reliable driving mechanism to the front axle assembly, irrespective of the angular relation of the rear axle assembly to the front axle assembly.

The equalizing frame 34 connecting the axle assemblies maintain the same in defined positions relative to each other and it is obvious that one of the frames 33 may be fixed to its stud 32 so that any lateral tilting action on the part of one axle assembly may tilt the connecting frame which will turn on the stud of the other axle assembly. This would prevent any lateral tilting movement of the equalizing frame 34 independent of the studs 32, however, any excessive side movement of this frame is prevented by the rods 34 engaging the upper portion of the transmission casing 23.

It is thought that the operation and utility of the four-wheel truck will be apparent without further description, and while in the drawings there is illustrated a preferred embodiment of my invention, it is to be understood that the structural elements are susceptible to such changes as are permissible by the appended claims.

What I claim is:

1. In a four-wheel truck, axle housings, wheel equipped axle shafts in said housings, a reduction gear mechanism between said axle housings operatively connected to said axle shafts, a drive extension shaft supported by said reduction gear mechanism and one of said axle housings and adapted for operating said reduction gear mechanism, and universal joints between said reduction gear mechanism and one of said axle housings establishing a driving relation between the axle shafts of said housing and said reduction gear mechanism, whereby one of said axle housings may assume an angular relation relative to the other axle housing 2. In a four-wheel truck, front and rear axle housings, wheel equipped axle shafts in said housings, a reduction gear mechanism between said axle housings and supported from the front axle housing and operatively connected to the axle shafts in said front axle housing, universal connections between said reduction gear mechanism and the axle shaft of said rear axle housing, and an equalizing frame extending over said rear axle housings and connected thereto so that said housings may tilt in synchronism.

3. The combination of a chassis, a spring suspension connected thereto, wheel equipped front and rear axle housings supporting said spring suspension, a reduction gear mechanism between said axle housings and supported from said front axle housing and operatively connected to the wheels of said axle housings for driving said wheels in synchronism, and a frame connecting the front side of the front axle housing to the rear side of the rear axle housing.

4. The combination called for in claim 3, and a universal connection between said reduction gear mechanism and a rear axle housing so as to establish a driving relation between said rear axle housing irrespective of the angular relation of one axle housing to the other.

5. In a four-wheel truck, front and rear axle housings, wheel equipped axle shafts in said axle housings, driving connections between the axle shafts of said axle housings, and a frame extending over said axle housings and connecting one axle housing to the other, said frame including end members swiveled to said housings and longitudinal members adapted to engage and disengage said housings at points laterally spaced from the swivel points.

6. The combination of a chassis, a spring suspension connected to said chassis, front and rear axle housings supporting said spring suspension, wheel equipped axle shafts in said axle housings, driving connections operatively connecting said axle shafts, and a frame connecting said rear axle housings independent of said chassis, said frame including end members swiveled to said housings and longitudinal members adapted to engage and disengage said housings at points laterally spaced from the swivel points.

7. In a four-wheel truck, axle housings, wheel equipped axle shafts in said housings, a reduction gear mechanism between said axle housings operatively connected to said axle shafts, a drive extension shaft supported by said reduction gear mechanism and one of said axle housings and adapted for operating said reduction gear mechanism, and an equalizing frame connected to said rear axle housings and extending over said housings.

8. In a four-wheel truck, front and rear axle housings, wheel equipped axle shafts in said housings, a reduction gear mechanism between said axle housings and supported from the front axle housing and operatively connected to the axle shafts in said front axle housing, universal connections between said reduction gear mechanism and the axle shaft of said rear axle housing, and a drive shaft extension supported by said front axle housing and movable therewith.

9. The combination of a chassis, a spring suspension connected to said chassis, front and rear axle housings supporting said spring suspension, wheel equipped axle shafts in said axle housings, driving connections operatively connecting said axle shafts, and a frame connecting said rear axle housings independent of said chassis, said driving connections including a reduction gear mechanism supported solely from one of said rear axle housings.

In testimony whereof I affix my signature.
JOHN C. HAGGART, Jr.